United States Patent [19]

Davis et al.

[11] 4,256,860
[45] Mar. 17, 1981

[54] COPOLYETHERESTERS

[75] Inventors: Burns Davis; Robert B. Barbee; Harry R. Musser, all of Kingsport, Tenn.

[73] Assignee: Eastman Kodak Company, Rochester, N.Y.

[21] Appl. No.: 106,963

[22] Filed: Dec. 26, 1979

[51] Int. Cl.³ .............................................. C08G 63/76
[52] U.S. Cl. .................... 525/437; 528/272; 528/301; 528/302
[58] Field of Search ................ 525/437; 528/272, 301, 528/302

[56] References Cited

U.S. PATENT DOCUMENTS

| | | | |
|---|---|---|---|
| 3,261,812 | 7/1966 | Bell et al. | 528/301 X |
| 3,523,923 | 8/1970 | Smith et al. | 528/301 X |
| 4,075,180 | 2/1978 | Davis et al. | 528/309 X |
| 4,155,889 | 5/1979 | Fagerburg et al. | 528/272 X |

*Primary Examiner*—Lucille M. Phynes
*Attorney, Agent, or Firm*—John F. Stevens; Daniel B. Reece, III

[57] ABSTRACT

Disclosed are high melt strength, blow-moldable polymers that can be formed into bottles, tubing, film and the like. The polymers are copolyetheresters having an inherent viscosity of from 1.0 to about 2.5 comprising A. a dicarboxylic acid component consisting essentially of 1,4-cyclohexanedicarboxylic acid, and
B. a diol component comprising
  (1) at least 70 mole percent 1,4-cyclohexanedimethanol, and
  (2) from about 15 to about 60 weight percent, based on the weight of the polyetherester, of polypropyleneether glycol having a molecular weight of 1000 to 4000.

10 Claims, No Drawings

COPOLYETHERESTERS

BACKGROUND OF THE INVENTION

1. Field of the Invention

This invention relates to elastomeric copolyetheresters based on poly(1,4-cyclohexanedimethylene 1,4-cyclohexanedicarboxylate) modified with polypropyleneether glycol which may be extrusion blown into clear flexible bottles or film. The ability to be blow molded is the result of high melt strength.

A polymer having melt strength is described as one which can support its own weight in the molten state after being extruded from a die. When a polymer without melt strength is melt extruded downward from a die, the melt rapidly drops and forms a thin string or breaks. Such polymers are not useful for extrusion blow molding objects. When polymers have sufficient melt strength they can be extruded downward in the shape of a hollow cylinder. Bottles can be blown by clamping a bottle mold around the molten hollow cylinder into which air is blown to form the bottle.

2. Description of the Prior Art

Copolyetheresters known in the art include poly(1,4-cyclohexanedimethylene 1,4-cyclohexanedicarboxylate) modified with polypropyleneether glycol and having an inherent viscosity up to about 0.9. Such copolyetheresters having an inherent viscosity of from 1.0 to about 2.5 have surprisingly been found to have a melt strength higher than would have been expected. For example, polytetramethyleneether glycol would normally be the ether glycol of choice because of easier preparation and better heat stability, but is found to produce a polymer having a significantly lower melt strength than polypropyleneether glycol, thus hindering its ability to be blow-molded.

As stated above, poly(1,4-cyclohexanedimethylene 1,4-cyclohexanedicarboxylate) having an inherent viscosity of less than about 0.9 is known. Poly(1,4-cyclohexanedimethylene 1,4-cyclohexanedicarboxylate) having an inherent viscosity of from 1.0 to about 2.5, however, has a melt strength sufficiently higher to be extrusion blown into useful articles such as bottles or film.

SUMMARY OF THE INVENTION

The present invention provides a high melt strength, blow-moldable polymer that can be formed into bottles, tubing, film and the like. The polymer is a copolyetherester having an inherent viscosity of from 1.0 to about 2.5 comprising A. a dicarboxylic acid component consisting essentially of 1,4-cyclohexanedicarboxylic acid, and
B. a diol component comprising
   (1) at least 70 mole percent 1,4-cyclohexanedimethanol, and
   (2) from about 15 to about 60 weight percent, based on the weight of the polyetherester, of polypropyleneether glycol having a molecular weight of 1000 to 4000.

DETAILED DESCRIPTION OF THE INVENTION

According to the present invention, a copolyetherester having an inherent viscosity of from 1.0 to about 2.5 and unexpectedly high melt strength is provided. The copolyetherester is derived from a dicarboxylic acid component consisting essentially of 1,4-cyclohexanedicarboxylic acid, and a diol component comprising (1) at least 70 mole percent 1,4-cyclohexanedimethanol and
(2) from about 15 to about 60 weight percent, based on the weight of the polyetherester, of polypropyleneether glycol having a molecular weight of 1000 to 4000.

The copolyetheresters of this invention can be prepared by the usual condensation processes and catalyst described in the prior art. Useful catalyst are titanium and tin. After ester interchange with excess glycol, vacuum is applied to the heated polymer to remove excess glycol and form the high molecular weight polymer. Melt phase polycondensation can be used to prepare the high molecular weight polymer or a combination of melt and solid phase polymerization can be used. The polymers can also be prepared using a second low molecular weight glycol because this gives faster increase in molecular weight. Branching agents and terminating agents can also be used.

The term "consisting essentially of" is intended to include small amounts of other acids, e.g., up to about 5 mole percent. Also, by "polypropyleneether glycol" we mean compounds containing at least 70 mole percent of such units; up to 30 mole percent may be polyethyleneether glycol.

The compositions of this invention have inherent viscosity of from about 1.00 to about 2.5. Inherent viscosities of less than about 1.00 do not have sufficient melt strength for production of blown products.

In particular, these new compositions are copolyetheresters of poly(1,4-cyclohexane-dimethylene 1,4-cyclohexanedicarboxylate) modified with from 15 to 60 weight percent polypropyleneether glycol of 1000 to 4000 molecular weight. They may also contain from 0.05 to 2 mole percent of a branching agent, and preferably contains up to 30 mole percent of a second low molecular weight glycol. The branching agent may be either tribasic acids, such as trimellitic anhydride or trimesic acid, or polyhydric alcohols, such as pentaerythritol trimethylol propane, or polyoxypropyleneether triol. The second glycol can contain two to five carbon atoms and may be ethylene glycol, 1,4-butanediol, or 2,2-dimethyl-1,3-propanediol. The 1,4-cyclohexanedimethanol and 1,4-cyclohexanedicarboxylate portions of the copolyetheresters must be high in trans configuration in order to provide high melting polymer. Melting point or maximum peak during melting is determined on a differential scanning calorimeter Model DSC-2 from Perkin-Elmer Company at a heating rate of 20° C. per minute.

Melt strength is measured by extruding molten polymer through a die 0.1 inch in diameter and 0.25 inch long. The extrudate is allowed to fall freely from the die exit under gravity. The diameter of the extrudate supporting a six inch length of the extrudate is measured. If the extrudate is less than 0.1 inch in diameter, the die swell is then a negative number because there is no swell. If the extrudate is larger than 0.1 inch in diameter, the die swell is a positive number. The die swell is expressed as a percent. It is calculated as follows using a 0.1 inch diameter die.

Die Swell, Percent =
$$\frac{\text{Diameter in inches of Extrudate at six inches} - 0.1 \text{ inch}}{0.1 \text{ inch}} \times 100$$

A die swell of 0% therefore indicates no change in the size of the extrudate. While polymers having die swells of down to about −50% can be blow-molded in some instances, it is preferred that the die swell be within the range of about −20% to about 50%.

According to a preferred process for producing the polymers of this invention, melt phase copolymerization is carried out using conventional techniques, preferably by the well known ester interchange reaction, to an I.V. of from about 0.50 to about 1.10. The process involves heating and stirring trans-dimethyl-1,4-cyclohexane-dicarboxylate, with the 1,4-cyclohexanedimethanol and the polypropyleneether glycol. An excess of 1,4-cyclohexanedimethanol glycol is normally used. The reaction mixture is stirred at a temperature of 175° C. to 250° C. for a period of 10 to 180 minutes. Heat is then increased to about 220° C. to about 275° C. and the reaction mixture is put under reduced pressure to remove excess glycol. The heat is then removed and the reaction brought to atmospheric pressure. The reaction time is dependent on temperature, catalyst, glycol excess and equipment. Other esterification procedures will be obvious to those skilled in the art. For example, the polypropyleneether glycol can be added to the reaction just before applying the reduced pressure.

The copolymer is then formed into pellets which are suitable for solid phase copolymerization.

The polycondensation step in the solid phase is utilized to complete the polymerization of the copolyester or to carry it to a molecular weight higher than those achieved by melt condensation. At the end of the partial melt polycondensation as it is described above the copolyester typically has an inherent viscosity of at least 0.8. In order to achieve higher inherent viscosity the copolyester particles are subjected to additional processing.

The copolyester particles should have a particle size not greater than about 5 mesh, preferably 5 to 20 mesh and most preferably 6 to 12 mesh as determined by the U.S. Bureau of Standards, Standard Screen Series. Much smaller particles, e.g. 100 mesh, can be used but are not preferred.

The particles required for the solid phase polycondensation can be formed by any conventional techniques. The partially condensed material from the melt can be cooled by casting on a cold wheel and shredding the resulting sheet. A preferred technique involves forming a strand of the melt, quenching it with cold water and cutting the strand into pellets of about 0.62 in. to 0.125 in. in diameter. The use of these large particles avoids many of the complications previously encountered with solid phase polycondensate.

The particles are subjected to a temperature of about 110°–200° C., preferably about 10° C. below the polymer stick temperature for a period of about 1 to 72 hours, usually for about 4 to 48 hours. Significant advantages are realized by increasing the inherent viscosity at these relatively low temperatures at which little or no thermal degradation occurs to cause odor and color formation.

The solid phase polycondensation takes place in an inert gas stream or in a vacuum. Preferred inert gas streams are nitrogen, carbon dioxide and carbon monoxide. When an inert gas stream is used, the pressure may range from reduced pressures as low as about 1 mm. Hg up to superatmospheric pressure, but operation at about 1 atmosphere is preferred. If vacuum is to be utilized alone a pressure of less than about 1 mm. Hg should be maintained. The use of an inert gas stream or vacuum is essential to remove polymerization by-products, normally the low molecular weight diol, from the space surrounding the copolyester particles as the polymerization is reversible in the presence of the by-products. The use of an inert gas stream at about atmospheric pressure is preferred.

The solid phase polycondensation can be carried out in batch and continuous equipment such as fixed bed reactors, rotating reactors, moving bed reactors and fluid-bed reactors. The solid phase polycondensation reaction is continued until the desired inherent viscosity of from 1.0 to about 2.50 is reached. The course of the reaction may be followed by removing samples periodically and determining their inherent viscosity. If a correlation has been developed between inherent viscosity and melt index for the copolyester being prepared, the melt index of periodic samples can be used to follow the reaction.

The properties of these copolyetheresters can also be modified by incorporation of various conventional additives such as carbon black, silica gel, alumina, clays, chopped fiber glass and mold release agents. In general, these additives have the effect of increasing the modulus of the material at various elongations. Compounds having a range of hardness values can be obtained by blending hard and soft polyesters of this invention.

Additionally, if desired, stabilizers may be added to the copolyesters.

If desired, conventional cross-linking agents such as polyfunctional compounds containing 3 or more functional groups (for example hydroxyl, carboxyl or esters thereof) may be used as part of the acid or glycol components in amounts of up to about 5 mol percent. When crosslinking agents are used, it is preferred to use from about 0.05 to about 2 mol percent. Trimetallic anhydride may be used as a small portion of the acid component.

The following examples are submitted for a better understanding of the invention. Die swells in the examples are run at a shear rate of 20 reciprocal seconds.

EXAMPLE 1

Poly(1,4-cyclohexanedimethylene-trans-1,4-cyclohexanedicarboxylate) modified with about 36.3 weight percent of 2000 molecular weight polypropyleneether glycol and about 11.3 mole percent of ethylene glycol is prepared by stirring with heating 4,228.17 grams of trans dimethyl-1,4-cyclohexanedicarboxylate, 2724.0 grams of 1,4-cyclohexanedimethanol (72.7% trans and 27.3% cis), 655.6 grams of ethylene glycol, 3587.5 grams of Niax 2025 ONE polypropyleneether glycol, 2.7 grams of Irganox 1010 and 100 parts per million of titanium from titanium acetyltriisopropoxide. The reaction is kept under nitrogen and the temperature is raised from about 23° C. to 235° C. over a period of 3.75 hours and held at 235° C. for one hour. Methanol is allowed to distill. The nitrogen is removed and a vacuum is applied to the reaction over a period of four hours and 40 minutes while raising the temperature to 245° C. The final pressure is 250 microns. The final polymer has an inherent viscosity of 0.96 and is ground to pass a six millimeter screen. The 1,4-cyclohexanedicarboxylate entity of the polymer contains 91.5 percent of the trans isomer and 8.5 percent of the cis isomer. The differential scanning calorimeter (DSC) melting peak is 190° C. The ground polymer (25 gram samples) is further polymerized in the solid phase at 160° C. at about 0.05 millimeters of mercury pressure for the times shown in Table 1 to give the shown inherent viscosities. Die swells are run at 205° C. on the solid phased polymer and are also shown in Table 1.

TABLE 1

| Time, Hours | Inherent Viscosity | Die Swell, Percent |
|---|---|---|
| 12 | 1.15 | −25 |
| 18 | 1.33 | −9 |
| 24 | 1.35 | 10 |
| 36.5 | 1.50 | 43 |

The polymer from Example 1 is also ground to pass a three millimeter screen and solid phased as in Example 1. Die swell are shown in Table 2.

TABLE 2

| Time, Hours | Inherent Viscosity | Die Swell, Percent |
|---|---|---|
| 11 | 1.18 | −37 |
| 17 | 1.25 | −10 |
| 23 | 1.40 | 21 |

EXAMPLE 2

This example represents a polymer of the prior art using polytetramethyleneether glycol. Poly(1,4-cyclohexanedimethylene-trans-1,4-cyclohexanedicarboxylate) modified with 38.6 weight percent of 2000 molecular weight polytetramethyleneether glycol and about 9.5 mole percent of ethylene glycol is prepared by stirring with heating 67.9 grams of trans-dimethyl-1,4-cyclohexanedicarboxylate, 6.5 grams of ethylene glycol, 47.0 grams of 1,4-cyclohexanedimethanol, 60.0 grams of Polymeg polytetramethyleneether glycol of 2000 molecular weight, 0.3 gram of Irganox 1010, and 100 ppm of titanium as titanium acetyltriisopropoxide. The reaction mixture is stirred at 237° C. for 60 minutes under nitrogen. Methanol is allowed to distill. The heat is increased to 260° C. and the reaction mixture is put under reduced pressure (about 0.2 millimeter Hg) for 1.5 hours to remove excess glycol. The heat is removed and the reaction mixture let down to atmospheric pressure with nitrogen. The resulting polymer has an inherent viscosity of 1.19. The polymer is ground to pass a 3 millimeter screen. The 1,4-cyclohexanedicarboxylate entity of the final polymer is 91.7% trans isomer and 8.3% cis isomer. The polymer shows a melting peak of 191° C. by DSC. The ground polymer (25 gram samples) is further polymerized in the solid phase at 157° C. at about 0.05 millimeters of mercury pressure for the times shown in Table 2 to give the shown inherent viscosities. Die swells are run at 205° C. on the solid phased polymers and are also shown in Table 3.

TABLE 3

| Time, Hours | Inherent Viscosity | Die Swell, Percent |
|---|---|---|
| 3 | 1.25 | −63 |
| 8 | 1.26 | −55 |
| 12 | 1.35 | −35 |
| 24 | 1.40 | −27 |

The die swell results from Tables 1, 2 and 3 for each copolymer clearly show that the copolyesterethers based on polypropyleneether glycol have superior die swell to the copolyetheresters based on polytetramethyleneether glycol.

EXAMPLE 3

A procedure similar to Example 2 is repeated in the preparation of a copolyetherester consisting of 99.3 mole percent 1,4-cyclohexanedicarboxylate (94.9 percent trans and 5.1 percent cis isomers) and 0.7 mole percent trimellitate as the acid component. The glycol component consists of 81.8 mole percent 1,4-cyclohexanedimethanol (about 70 percent trans and 30 percent cis isomers), 10.1 mole percent ethylene glycol and 8.1 mole percent (37.6 weight percent based on total polymer) of Niax 2025 ONE 1,2-polypropyleneether glycol. The copolyesterether also contains 0.13 weight percent Irganox 1010 tetrakis[methylene 3-(3,5-di-t-butyl-4-hydroxyphenyl)propionate]methane, 100 parts per million titanium, and has an inherent viscosity of 0.91. The copolyetherester is ground to pass a 2.0 millimeter screen and polymerized (25 gram samples) in the solid phase at 150° C. at about 0.05 millimeters of mercury for the times shown in Table 4 to give the shown inherent viscosities. Die swells are run at 205° C. on the solid phased polymer and are also shown in Table 4.

TABLE 4

| Time, Hours | Inherent Viscosity | Die Swell, Percent |
|---|---|---|
| 6.0 | 1.03 | −60 |
| 14.0 | 1.28 | 30 |
| 12.0 | 1.38 | 51 |
| 20.5 | 1.57 | 83 |

EXAMPLE 4

A procedure similar to Example 2 is repeated in the preparation of a copolyetherester consisting of 99.3 mole percent 1,4-cyclohexanedicarboxylate (94.3 percent trans and 5.7 percent cis isomers) and 0.7 mole percent trimellitate as the acid component. The glycol component consists of 81.7 mole percent 1,4-cyclohexanedimethanol (about 70 percent trans and 30 percent cis isomers), 10.0 mole percent of ethylene glycol and 8.3 mole percent (38.8 weight percent based on total polymer) of 2000 molecular weight polytetramethyleneether glycol. The copolyether also contains 0.15 weight percent Irganox 1010 antioxidant, 100 parts per million of titanium, and has an inherent viscosity of 1.10. The copolyetherester with a DSC melting peak of 190° C. is ground to pass a 2.0 millimeter screen and polymerized (25 gram samples) in the solid phase at 150° C. at about 0.05 millimeters of mercury for the times shown in Table 5 to give the shown inherent viscosities. Die swells are run at 205° C. on the solid phased polymer and are also shown in Table 5.

TABLE 5

| Time, Hours | Inherent Viscostiy | Die Swell, Percent |
|---|---|---|
| 1.5 | 1.14 | −75 |
| 4.0 | 1.26 | −53 |
| 2.5 | 1.38 | −30 |
| 14.0 | 1.55 | 21 |

EXAMPLE 5

A procedure similar to Example 2 is repeated in the preparation of a copolyesterether consisting of 99.3 mole percent 1,4-cyclohexanedicarboxylate (94.1 percent trans and 5.9 percent cis isomers) and 0.7 mole percent trimellitate as the acid components. The glycol component consists of 81.9 mole percent 1,4-cyclohexanedimethanol (about 70 percent trans and 30 percent cis isomers), 9.7 mole percent ethylene glycol and 8.4 mole percent (39.2 weight percent based on total polymer) of Pluronics L61 copolypropyleneetherethyleneether containing 10 weight percent of the ethyleneether segments. The copolyetherester also contains 0.13 weight percent Irganox 1010, 100 parts per million titanium and has an inherent viscosity of 0.94. The copolyetherester with a DSC melting peak of 190° C. is ground to pass a 2.0 millimeter screen and polymerized (25 gram samples) in the solid phase at 150° C. at about 0.05 millimeters of mercury for the times shown in Table 6 to give the shown inherent viscosities. Die swells are run at 205° C. on the solid phased polymer and are also shown in Table 6.

TABLE 6

| Time, Hours | Inherent Viscosity | Die Swell, Percent |
|---|---|---|
| 6.0 | 1.02 | −17 |
| 14.0 | 1.28 | 41 |
| 20.5 | 1.40 | 61 |

EXAMPLE 6

This example describes the melt strength of a polymer containing 1,2-polypropyleneether glycol, brancher, and only one low molecular weight glycol. Poly(1,4-cyclohexanedimethylene-1,4-cyclohexanedicarboxylate) modified with 0.5 mole percent trimellitate and 27 weight percent (based on total polymer weight) 2000 molecular weight 1,2-polypropyleneether glycol, is prepared by stirring with heating 77.89 grams of dimethyl-1,4-cyclohexanedicarboxylate 0.38 g. of trimellitic anhydride, 56.0 grams of 1,4-cyclohexanedimethanol (about 70 percent trans 30 percent cis isomers), 43.45 grams of 2000 molecular weight Niax 2025 ONE 1,2-polypropyleneether glycol, 0.30 grams of Irganox 1010, and 100 parts per million of titanium from titanium acetyltriisopropoxide. The reaction is heated with stirring under nitrogen at 240° C. for one hour while methanol is allowed to distill. Nitrogen is removed, the temperature is raised to 265° C. and a vacuum applied for 22 minutes. The final pressure reaches about 0.10 millimeters of mercury. Heat is removed and the final polymer let down to atmospheric pressure with nitrogen. The resulting polymer has an inherent viscosity of 0.86, a melting peak of 218° C. by DSC, and is ground to pass a 2.0 millimeter screen. The 1,4-cyclohexanedicarboxylate entity of the final polymer is 95.1 percent trans and 4.9 percent cis isomers. The ground polymer (25 gram samples) is further polymerized in the solid phase at 170° C. at about 0.05 millimeters of mercury pressure for the times shown in Table 7 and to give the inherent viscosities shown. Die swells are run at 235° C. on the solid phased polymer and are shown in Table 7.

TABLE 7

| Time, Hours | Inherent Viscosity | Die Swell, Percent |
|---|---|---|
| 6 | 1.22 | 3 |
| 12 | 1.40 | 51 |
| 18 | 1.54 | 67 |

EXAMPLE 7

This example is similar to Example 6 except polytetramethyleneether glycol is used in place of 1,2-polypropyleneether glycol. The preparation procedure is essentially the same as Example 6 except the polymer is prepared by polycondensation under reduced pressure at 237° C. The final polymer contains 99.5 mole percent 1,4-cyclohexanedicarboxylate (96.4 percent trans and 3.6 percent cis isomers) and 0.5 mole percent trimellitate as the acid components and the glycol components consist of 1,4-cyclohexanedimethanol and 30 weight percent (based on total polymer weight) of 2000 molecular weight polytetramethyleneether glycol. The inherent viscosity is 1.12 and the DSC melting peak is 219° C. Ground samples (25 grams) are solid phase polymerized at 170° C. for the times shown in Table 8 and give the inherent viscosities shown. Die swells are run at 235° C. on the solid phased samples and also are shown in Table 8.

TABLE 8

| Time, Hours | Inherent Viscosity | Die Swell, Percent |
|---|---|---|
| 1.0 | 1.18 | −66 |
| 2.0 | 1.30 | −37 |
| 3.0 | 1.38 | −17 |

EXAMPLE 8

This example describes the melt strength of a polymer prepared in the melt phase to a relatively high inherent viscosity. The polymer contains brancher and polytetramethyleneether glycol. A procedure similar to Example 2 is repeated in the preparation of this copolyetherester containing 99.3 mole percent 1,4-cyclohexanedicarboxylate (95.6 percent trans and 4.4 percent cis isomers) and 0.7 mole percent trimellitats as the acid components. The glycol component consists of 82.0 mole percent 1,4-cyclohexanedimethanol (70 percent trans and 30 percent cis isomers), 9.9 mole percent ethylene glycol, and 8.1 mole percent (37.3 weight percent based on total polymer weight of 2000 molecular weight polytetramethyleneester glycol. The copolyetherester also contains 0.15 weight percent Irganox 1010, has an inherent viscosity of 1.40 and a DSC melting peak of 188° C. The die swell of this polymer at 205° C. is −1.0 percent.

EXAMPLE 9

This example describes the melt strength of a polymer prepared in the melt phase to a relatively high inherent viscosity. The polymer contains brancher and 1,2-polypropyleneether glycol. A procedure similar to Example 2 is repeated in the preparation of this copolyetherester containing 99.3 mole percent 1,4-cyclohexanedicarboxylate (94.2 percent trans and 5.8 percent cis isomers) and 0.7 mole percent of trimellitate as the acid components. The glycol component consists of 81.5 mole percent 1,4-cyclohexanedimethanol, 10.8 mole percent of ethylene glycol and 7.8 mole percent (36 weight percent based on total polymer weight of 1,2-polypropyleneether glycol of Niax 2025 ONE 1,2-polypropyleneether glycol. Polycondensation under reduced pressure is carried out at 265° C. The copolyetherester also contains 0.14 weight percent Irganox 1010, a DSC melting peak of 188° C., and has an inherent viscosity of 1.21. The die swell of this polymer at 205°

C. is 4.0%. Table 9 compares the die swell of the copolyetherester prepared in Example 8 using polytetramethyleneether glycol with the die swell of Example 9 using 1,2-polypropyleneether glycol and shows that the polymer prepared from polypropyleneether glycol has the highest die swell even though it has a lower inherent viscosity.

TABLE 9

| Example | Inherent Viscosity | Die Swell, Percent | Polyetherglycol |
|---|---|---|---|
| 8 | 1.40 | −0.1 | Polytetramethyleneether glycol |
| 9 | 1.21 | 4.0 | 1,2-Polypropyleneether glycol |

As used herein, the inherent viscosity (I.V.) is measured at 25° C. using 0.50 gram of copolyester per 100 ml. of a solvent consisting of 60 percent by weight phenol and 40 percent by weight tetrachloroethane.

Unless otherwise specified, all parts, percentages, ratios, etc. are by weight.

The invention has been described in detail with particular reference to preferred embodiments thereof, but it will be understood that variations and modifications can be effected within the spirit and scope of the invention.

We claim:

1. A copolyetherester having an inherent viscosity of from 1.0 to about 2.5 comprising
   A. a dicarboxylic acid component consisting essentially of 1,4-cyclohexanedicarboxylic acid, and
   B. a diol component comprising
      (1) at least 70 mole percent 1,4-cyclohexanedimethanol, and
      (2) from about 15 to about 60 weight percent, based on the weight of the polyetherester, of polypropyleneether glycol having a molecular weight of 1000 to 4000.

2. A copolyetherester according to claim 1 in which the diol component comprises from 70 to about 99.5 mole percent 1,4-cyclohexanedimethanol and from about 0.5 to about 30 mole percent of a glycol containing from 2 to 5 carbon atoms.

3. A copolyetherester according to claim 1 having from about 0.05 to about 2 mole percent of branching agent comprising an acid, alcohol or mixture thereof having a functionality greater than 2.

4. A copolyetherester according to claim 1 having a die swell of no less than about −50%.

5. A copolyetherester according to claim 1 having a die swell within the range of about −20% to about 50%.

6. A copolyetherester according to claim 1 including up to 0.5 weight percent of sodium stearate as mold release agent.

7. A copolyetherester having an inherent viscosity of from 1.0 to about 2.5 comprising
   A. a dicarboxylic acid component consisting essentially of 1,4-cyclohexanedicarboxylic acid, and
   B. a diol component comprising
      (1) from about 70 to about 99.5,
      (2) from about 30 to about 0.5 mole percent of at least one other glycol having from 2 to 5 carbon atoms, and
      (3) from about 15 to about 60 weight percent, based on the weight of the polyetherester, of polypropyleneether glycol having a molecular weight of 1000 to 4000,
   said copolyetherester having a die swell of from about −20% to about 50%.

8. A copolyetherester according to claim 7 having from about 0.05 to about 2 mole percent of a branching agent comprising a tribasic acid or a polyhydric alcohol.

9. A blow-molded article comprising the copolyetherester according to claim 1.

10. A blow-molded article comprising the copolyetherester according to claim 7.

* * * * *